US008792582B2

(12) United States Patent
Muhammad

(10) Patent No.: US 8,792,582 B2
(45) Date of Patent: Jul. 29, 2014

(54) MOBILE WIRELESS COMMUNICATIONS DEVICE HAVING AUXILIARY RECEIVER TO DETERMINE TRANSMIT IMPAIRMENT AND GENERATE TRANSMIT IMPAIRMENT COMPENSATION SIGNAL, AND ASSOCIATED METHODS

(75) Inventor: Khurram Muhammad, Garland, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 211 days.

(21) Appl. No.: 13/360,091

(22) Filed: Jan. 27, 2012

(65) Prior Publication Data
US 2013/0195152 A1 Aug. 1, 2013

(51) Int. Cl.
H04K 1/02 (2006.01)
(52) U.S. Cl.
USPC ............................ 375/296; 375/220; 375/358
(58) Field of Classification Search
USPC .................. 375/219–222, 285, 295–296, 358
See application file for complete search history.

(56) References Cited

U.S. PATENT DOCUMENTS

| 7,672,359 | B2 | 3/2010 | Cleary et al. | |
| 7,706,475 | B1 * | 4/2010 | Kopikare et al. | 375/324 |
| 7,856,048 | B1 | 12/2010 | Smaini et al. | |
| 8,295,845 | B1 * | 10/2012 | Abdollahi-Alibeik et al. | 455/445 |
| 2003/0045249 | A1 | 3/2003 | Nielsen | |
| 2005/0123067 | A1 * | 6/2005 | Kim et al. | 375/298 |
| 2006/0004287 | A1 * | 1/2006 | Rigby et al. | 600/437 |
| 2007/0202812 | A1 * | 8/2007 | Park et al. | 455/75 |
| 2008/0159442 | A1 * | 7/2008 | Tanabe et al. | 375/324 |
| 2009/0074108 | A1 * | 3/2009 | Demir et al. | 375/298 |
| 2010/0099363 | A1 * | 4/2010 | Faust et al. | 455/69 |
| 2010/0232493 | A1 * | 9/2010 | Thirumoorthy | 375/232 |
| 2011/0069744 | A1 * | 3/2011 | Laudel et al. | 375/219 |
| 2011/0207418 | A1 * | 8/2011 | Laroia et al. | 455/75 |
| 2011/0228826 | A1 * | 9/2011 | Yokoo et al. | 375/219 |
| 2011/0292978 | A1 * | 12/2011 | Kravitz | 375/221 |
| 2012/0314784 | A1 * | 12/2012 | Pratt et al. | 375/260 |
| 2012/0328041 | A1 * | 12/2012 | Chen et al. | 375/285 |

* cited by examiner

Primary Examiner — Emmanuel Bayard
(74) Attorney, Agent, or Firm — Allen, Dyer, Doppelt, Milbrath & Gilchrist, P.A.

(57) ABSTRACT

A communications device includes a baseband input to receive a baseband signal. A transmitter is coupled to the baseband input and generates a transmit signal based upon the baseband signal, the transmit signal having an initial transmit impairment. An auxiliary receiver is coupled to the transmitter and generates a receive signal having a receive impairment therein resulting from the initial transmit impairment. A controller determines a power of the baseband signal by integrating a product of the receive signal and a complex conjugate of the baseband signal, and determines a power of the receive signal by integrating a product of the baseband signal and the receive signal. The controller also determines the initial transmit impairment based upon the power of the baseband signal and the receive signal, and generates a transmit impairment compensation signal based upon the initial transmit impairment.

20 Claims, 4 Drawing Sheets

MOBILE WIRELESS COMMUNICATIONS DEVICE HAVING AUXILIARY RECEIVER TO DETERMINE TRANSMIT IMPAIRMENT AND GENERATE TRANSMIT IMPAIRMENT COMPENSATION SIGNAL, AND ASSOCIATED METHODS

TECHNICAL FIELD

The present disclosure relates to the field of communications devices, and more particularly, communications devices with components that correct initial transmission impairments.

BACKGROUND

In general, undesired or non-ideal characteristics, such as transmission impairments (e.g. DC offset and in-phase/quadrature-phase (IQ) imbalance), degrade performance of mobile transceivers. The DC offset is the effect of self mixing by a mixer, and occurs when a signal of a local oscillator (LO) returns after leaking toward an antenna or when a radio frequency (RF) modulation signal input through the antenna is leaked to the local oscillator. Another way to create DC offset is through an inherent offset in the amplifiers due to imbalances. If the DC offset is amplified by amplifiers in the signal path, then this way may saturate a baseband circuit.

The IQ imbalance is caused when the phase difference between the in-phase (I) channel signal and the quadrature-phase (Q) channel signal generated in an oscillator of a wireless transmitter is not 90 degrees. The IQ imbalance can be reduced by designing mixers of the I channel demodulator and the Q channel demodulator to be precisely 90 degrees in phase delay (i.e., orthogonal) to each other. However, designing the mixers so that there is precisely a 90 degrees phase difference to each other is not practical over process and temperature variations. This is because in the layout, the I and Q paths to the mixers traverse different lengths despite the best effort of keeping everything symmetrical. This is especially true for multi-band systems. An IQ imbalance increases the Bit Error Rate (BER), thereby degrading the performance of the wireless transceiver. Moreover, IQ imbalances results in distorted images of the wanted signal being created. These distorted images may superimpose over the wanted signal, thereby degrading performance of the wanted signal. Current methods of dealing with IQ imbalances seek to both reduce the IQ imbalance and filter out the distorted images of the wanted signal.

Such current methods to correct IQ imbalances are determined by the dynamic range of the receiver used to detect the IQ imbalance. If the signal of interest and its image can not be observed with the available dynamic range, the image can not be detected or seen by processing circuitry that attempts to compute the complex image power. For example, if the image of 60 dB below the signal of interest, an analog to digital converter (ADC) with a 60 dB dynamic range will not show the image signal, particularly when the gain of the receive path is reduced. Hence, ADCs with high dynamic ranges are helpful for detecting the image signal when a reasonable headroom is desired between the signal received and the maximum input level of the ADC.

This issue becomes worse when higher image rejection is desired to allow a higher separation between the frequency of a local oscillator and the carrier frequencies. Hence, the dynamic range desired directly depends on the frequency separation and the amount of resulting desired resistance to VCO pulling in the design.

Therefore, there is still a need to improve such IQ imbalance compensation, and a need to reduce transmission impairments and the associated distortion in mobile transmitters.

DETAILED DESCRIPTION

Figure 1:
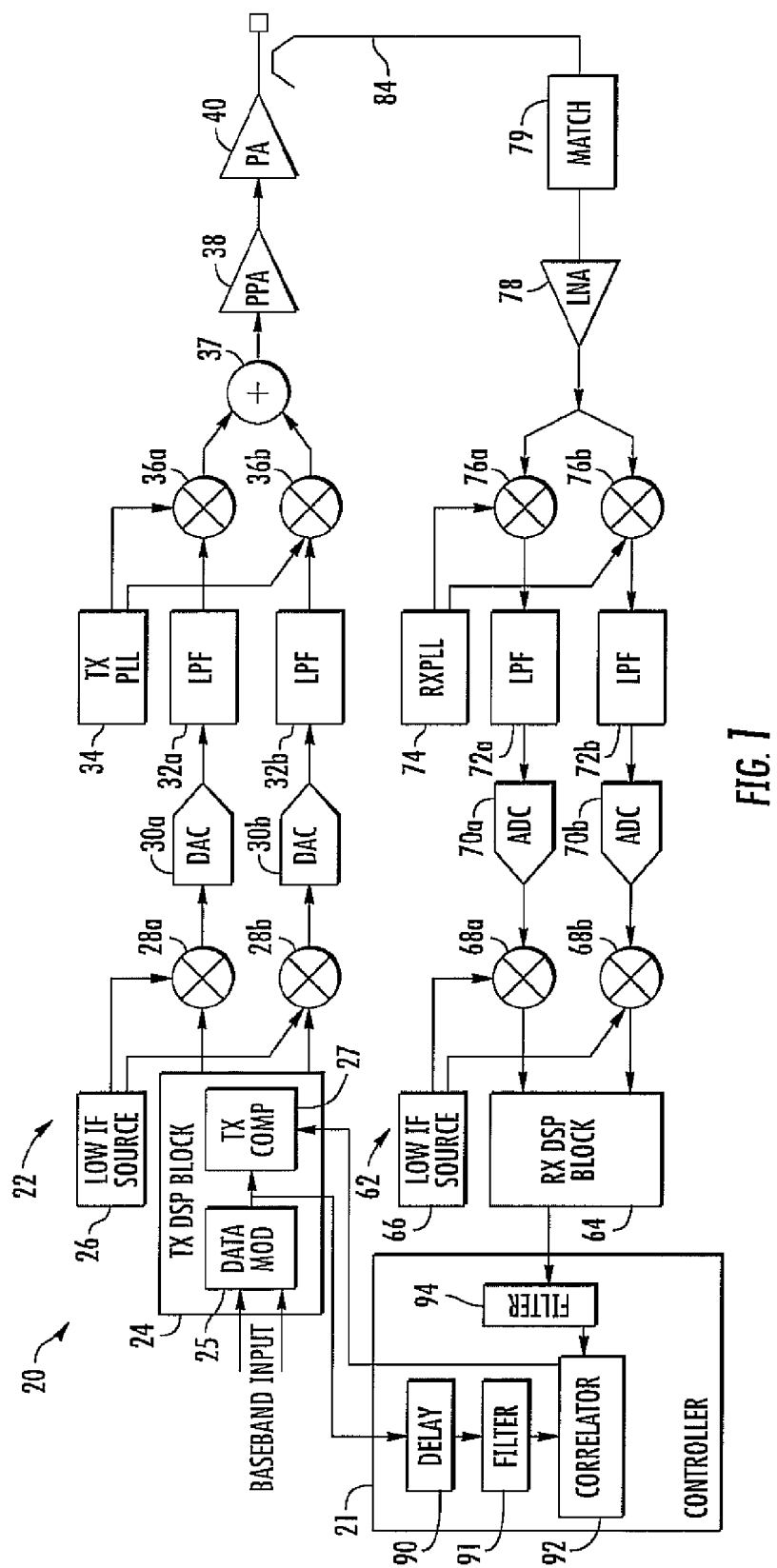
FIG. 1 is a schematic block diagram of a first embodiment of a communications device the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a mobile wireless communications device may comprise a baseband input configured to receive a baseband signal. A transmitter may be coupled to the baseband input and configured to generate a transmit signal based upon the baseband signal, the transmit signal having an initial transmit impairment. In addition, an auxiliary receiver may be coupled to the transmitter and may be configured to generate a receive signal having a receive impairment therein resulting from the initial transmit impairment. A controller may be coupled to the baseband input and the auxiliary receiver. The controller may be configured to determine a power of the baseband signal by integrating a product of the receive signal and a complex conjugate of the baseband signal, and determine a power of the receive signal by integrating a product of the baseband signal and the receive signal. The controller may further be configured to determine the initial transmit impairment based upon the power of the baseband signal and the power of the receive signal, and generate a transmit impairment compensation signal based upon the initial transmit impairment.

The controller may be configured to determine the power of the baseband signal and the power of the receive signal sequentially. Alternatively, the controller may comprise a first correlator configured to determine the power of the baseband signal, and a second correlator configured to determine the power of the receive signal.

In addition, the controller may comprise a delay block configured to delay the baseband signal before determination of the power of the baseband signal and the power of the receive signal. The transmit signal may include an in-phase (I) component and a quadrature-phase (Q) component.

The transmitter may include a transmit impairment compensator coupled to the controller and configured to compensate the transmit signal based on the transmit impairment compensation signal. In addition, the transmitter may have at least one digital-to-analog converter (DAC) coupled downstream of the baseband input. Also, the transmitter may also include at least one mixer coupled downstream of the at least one DAC.

The transmitter may further comprises a phase locked loop (PLL) coupled to the at least one mixer. The transmitter may also include at least one power amplifier downstream from the at least one mixer.

The auxiliary receiver may include a low noise amplifier (LNA), and at least one mixer coupled downstream of the LNA. The auxiliary receiver may further have a receiver phase locked loop (RXPLL) coupled to the at least one mixer. The auxiliary receiver may also have at least one analog-to-digital converter (ADC) coupled downstream of the at least one mixer.

A method aspect is directed to a method of operating a mobile wireless communications device comprising receiving a baseband signal at a baseband input. The method also includes generating a transmit signal based upon the baseband signal, the transmit signal having an initial transmit impairment, using a transmitter coupled to the baseband input.

The method further includes generating a receive signal having a receive impairment therein resulting from the initial transmit impairment, using an auxiliary receiver coupled to the transmitter. The method then proceeds with determining a power of the baseband signal by integrating a product of the receive signal and a complex conjugate of the baseband signal, using a controller coupled to the baseband input and the auxiliary receiver. The method further proceeds with determining a power of the receive signal by integrating a product of the baseband signal and the receive signal, using the controller, and determining the initial transmit impairment based upon the power of the baseband signal and the power of the receive signal, using the controller. The method then involves generating a transmit impairment compensation signal based upon the initial transmit impairment, using the controller.

With reference to FIG. 1, a communications device 20 is now described. The communications device 20 may be a mobile wireless communications device, such as a smartphone. The communications device 20 may be a multi-frequency band device that operates over a 2.4 GHz frequency band (i.e., approximately 2.4 to 2.483 GHz) and over a 5 GHz frequency band (i.e., approximately 4.9 to 6 GHz), for example. Depending on the intended application, the communications device 20 may operate over other frequency bands, as readily appreciated by those skilled in the art.

The communications device 20 includes a transmitter 22, and an auxiliary receiver 62. As will be explained in detail below, a controller 21 uses the auxiliary receiver 62 to detect impairments such as initial IQ imbalances in signals output by the transmitter 22 and directs the digital signal processing (DSP) block 24 of the transmitter to correct input baseband signals so as to reduce the IQ imbalance in the signals output by the transmitter. The auxiliary receiver 62 is coupled to the transmitter 24.

Figure 3A:
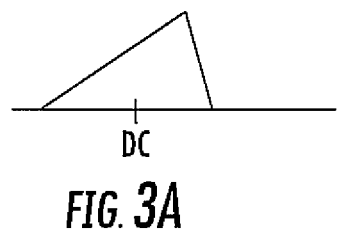
FIGS. 3A-3D illustrate the baseband signal, transmit signal, and receive signal at various points of time.

The transmitter 22 will now be described in detail. The transmitter 22 includes a transmit (TX) DSP block 24 configured to receive a baseband signal at a baseband input, and to then output a baseband signal having in-phase (I) and quadrature (Q) components and to therefore generate and output complex IQ signals. The baseband signal received at the baseband input is shown in FIG. 3A. The complex IQ signals have an IQ imbalance caused by other components of the transmitter 22, meaning that there may be a phase imbalance between the I and Q signals (e.g. I and Q are not 90° apart in phase). The TX DSP block 24 comprises a data modulator 25 that generates the baseband signal, and a transmit compensator (TX compensator) 27 coupled thereto. As will be explained below, the controller 21 corrects the initial IQ imbalance using the TX compensator 27.

The I and Q outputs from the TX DSP block 24 are mixed by the mixers 28a, 28b to a low intermediate frequency (IF) by a low IF source 26 coupled to the mixers. Digital to analog converters (DACs) 30a, 30b are coupled to the mixers 28a, 28b, and low pass filters 32a, 32b are coupled to the DACs.

Mixers 36a, 36b are coupled to the low pass filters 32a, 32b. The complex IQ signals are driven to the desired transmit frequency by the transmitter phase locked loop 34, which is coupled to the mixers 36a, 36b. The complex IQ signals (now at the desired transmit frequency) are summed by the summer 37, and then fed downstream to a pre-power amplifier 38, and in turn to a power amplifier 40. The power amplifier 40 outputs a RF modulated signal having the initial IQ imbalance. The pre-power amplifier 38 is used to ensure that there is enough power to drive the power amplifier 40.

Figure 3B:
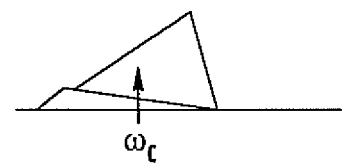

An RF modulated signal having the initial IQ imbalance from the transmitter 22 is provided to the auxiliary receiver 62 using a non-directional coupler 84 coupled between the power amplifier 40 and the antenna (not shown), and is therefore received as a receive baseband signal. A graph of an example receive baseband signal is shown in FIG. 3B.

An advantage of using a non-directional coupler 84 is that it can operate over a wide band of operation, and its performance remains well controlled over temperature and frequency changes. In addition, a non-directional coupler 84 helps to prevent the PLL 74 of the auxiliary receiver 62 from parasitically coupling to the output of the transmitter 16. Instead of using a non-directional coupler, it is possible to use a directional coupler. The use of a directional coupler provides a steady feedback signal independent of the VSWR variation at the antenna or the PPA load. However, a non-directional coupler is preferred because it is wideband and simpler to implement.

The auxiliary receiver 62 can be of lower performance as compared to a main receiver (not shown) of the communications device 20 since it is primarily designed to serve the transmitter 22. For example, the auxiliary receiver 62 may not need to have a high dynamic range like a main receiver, nor a high selectivity.

The auxiliary receiver 62 is configured to have an independent, dedicated phase-locked loop 74 that is offset from the TX PLL 34 operating the transmitters 22. This advantageously allows the initial IQ imbalance, to be separated in the frequency domain from IQ imbalances or other impairments added in the auxiliary receiver 62.

As explained above, the auxiliary receiver 62 includes a low noise amplifier 78 to receive the RF modulated signal having the IQ imbalance. The output of the low noise amplifier 78 is provided to the mixers 76a, 76b. The auxiliary receiver 62 is configured as a 0-IF receiver since the transmitter 22 is configured as low-IF transmitter (i.e., dual-mixer mode). This means that a second set of mixers 68a, 68b may not be needed and is selectively set to a value of 1 (i.e., $e^{j0}$) by the source 66.

The mixers 76a, 76b receive the RF modulated signal having the IQ imbalance, and I and Q local oscillator signals from the RX PLL 74. As noted above, the auxiliary receiver 62 is configured to have an independent, dedicated phase-locked loop 74 that is offset from the PLL's 34, 54 of the transmitters 22, 42. This advantageously allows the initial IQ imbalance in the RF modulated signal to be separated in the frequency domain from impairments added in the auxiliary receiver 62.

Figure 3C:
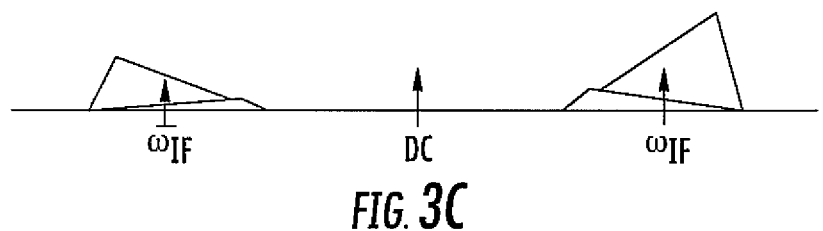
Figure 3D:
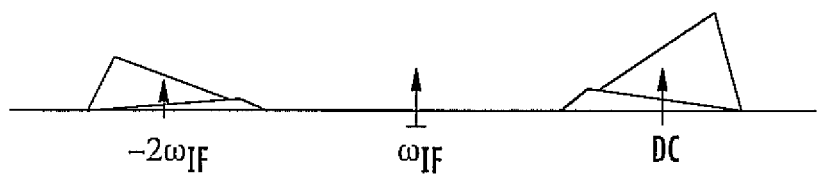

The output of the mixers 76a, 76b provide receive modulated analog I and Q component signals at the intermediate frequency. These signals are provided to low pass filters 72a, 72b and then to analog-to-digital converters 70a, 70b so that the receive baseband modulated analog I and Q component signals are now receive baseband modulated digital I and Q component signals at the intermediate frequency. The receive baseband modulated digital I and Q component signals at the intermediate frequency include the receive impairment (initial IQ imbalance) spectrally separated from the transmit impairment. Example receive baseband signals after the ADCs 70a, 70b are shown in FIG. 3C. These signals are passed through the mixers 68a, 68b, which translate this complex signal to zero-IF in a second down-conversion operation by frequency using the low IF source 46. Example receive signals, after downconversion to zero-IF, are shown in FIG. 3D.

The controller 21 is coupled to the output of the data modulator 25 and to the output of the auxiliary receiver 62. The controller 21 receives the transmit baseband modulated signal from the data modulator 25. The transmit baseband modulated signal is also referred to as the reference signal since it does not include the initial IQ imbalance from the transmitter 22.

The controller 21 also receives the receive baseband modulated signal as provided by the auxiliary receiver 62. The receive baseband modulated signal includes the transmit baseband modulated signal as well as the receive impairment spectrally separated from the transmit impairment.

The controller 21 includes a delay circuit 90 configured to delay the transmit baseband modulated signal so that this signal and the receive baseband modulated signal match up in time when compared. The delay circuit 90 may be configured to implement a fixed delay corresponding to inherent delays of the transmitter 22 and the auxiliary receiver 62, and a variable delay corresponding to variable environmental conditions. The variable delay accounts for environmental conditions, such as operating temperature variations, for example. In particular, the analog sections within the transmitter 22 and the auxiliary receiver 62 are affected by temperature variations.

The correlator 92 within the controller 21 estimates the IQ imbalance and other impairment within the transmitter 22 and generates an IQ or impairment compensation signal for that transmitter based on the estimated transmit impairment. To estimate the impairment (IQ imbalance), the correlator 92 determines a complex power value of the baseband signal and the receive signal, and then determines the transmit impairment based thereupon. In particular, the correlator 92 determines a power of the baseband signal by integrating a product of the receive signal and a complex conjugate of the baseband signal, and then determines a power of the receive signal by integrating a product of the baseband signal and the receive signal. The correlator then 92 then determines the initial transmit impairment based upon the power of the baseband signal and the power of the receive signal, and generate a transmit impairment compensation signal based upon the initial transmit impairment.

Figure 2:
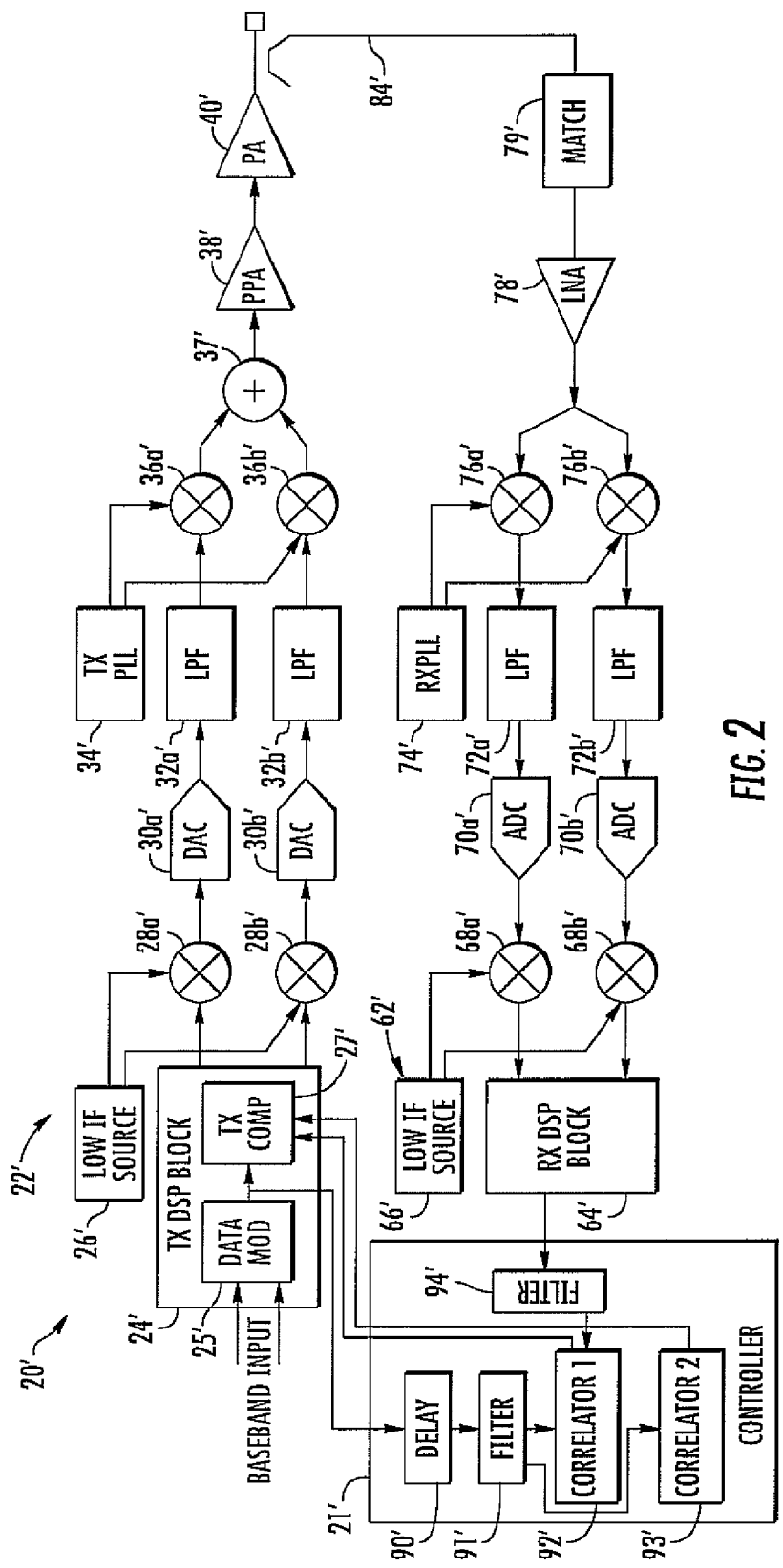
FIG. 2 is a schematic block diagram of a second embodiment of a communications device of the present disclosure.

In some applications, as shown in FIG. 2, one correlator 92' determines the power of the baseband signal, while another correlator 93' determines the power of the received signal. This allows parallel processing of the powers, as opposed to sequential processing of the powers are performed by the correlator 92 in FIG. 1.

Returning now to the discussion of FIG. 1, as stated above, the transmitter 22 includes a transmit impairment compensator 27 configured to compensate the transmit baseband modulated-signal based on the compensation signal. The transmit impairment compensator 27 is positioned between the data modulator 25 and the mixers 28a, 28b. Alternatively, the transmit impairment compensator 27 may be implemented within the controller itself if the transmitter chain is routed through the controller 21.

Details of estimating the transmit impairment, using the correlator 92 are now given. The received signal with an IQ imbalance and a dc offset can be described as:

$$rx(t) = A(t)(e^{j\phi(t)} + \beta e^{-j\phi(t)}) + dc + q(t)$$

where q(t) represents the quantization and other noise. Normally, rx(t) is processed directly to evaluate the IQ imbalance or DC offset by a digital block. Specifically for computing the DC offset, a LPF is used. The IQ imbalance can be computed through many techniques such as the ones described in U.S. Patent Application Publication No. 2013/0058388 to Muhammad, and assigned to the same assignee as this application, the contents of which are hereby incorporated by reference in their entirety.

The received signal is discretized by the ADC to generate a symbol sequence, rx(nTs) where Ts is the sampling period and m is the time index. It should be noted that rx(nTs) will be conveniently referred to as rx(n), where n now represents the time index. We define a sequence, s(n) that is obtained from M successive symbols of rx(n) as follows:

$$s(k) = \sum_{n=kM}^{(k+1)M-1} rx(n) \cdot A(n) e^{j\varphi(n)}$$

where k is an integer index for 0 onwards. Then s(k) is equivalent to $$s(k) = \sum_{n=kM}^{(k+1)M-1} [A(n)(e^{j\varphi(n)} + \beta e^{-j\varphi(n)}) + dc + q(n)] \cdot A(n) e^{j\varphi(n)} =$$

$$\sum_{n=kM}^{(k+1)M-1} A^2(n) e^{j2\varphi(n)} + \beta \sum_{n=kM}^{(k+1)M-1} A^2(n) +$$

$$dc \sum_{n=kM}^{(k+1)M-1} A(n) e^{j\varphi(n)} + \sum_{n=kM}^{(k+1)M-1} A(n) e^{j\varphi(n)}$$

Assuming that φ is uniformly distributed between 0 and which 2π is a reasonable assumption for modulation data. For large M, all the terms remain small except for $\beta \sum_{n=kM}^{(k+1)M-1} A^2(n)$ as it keeps on accumulating and growing.

In other words, $$s(k) \approx \beta \sum_{n=kM}^{(k+1)M-1} A^2(n)$$

This extracts the image power from rx(n), while rejecting the noise and the other terms. M resembles the "processing gain" that may be exploited in dispreading spread-spectrum signals and allows the image signal below the quantization noise floor of the ADC to be observable in the DSP path. When the receive mixer has a phase offset from the received signal, the quantity s(k) extracted from the averaging circuit is given as:

$$s(k) \approx \beta \sum_{n=kM}^{(k+1)M-1} A^2(n)e^{j\theta} = \beta e^{j\theta} \sum_{n=kM}^{(k+1)M-1} A^2(n)$$

This makes s(k) a complex number rather than real. The transmitter IQ imbalance decreases if the power of s(k) decreases. Hence image power (IP) can be measured as:

$$IP = \frac{1}{L}\sum_{k=0}^{L} s^2(k)$$

In this definition, the smaller the value of IP, the higher is the image rejection. The choice of M and/or L depends on how selective the filter extracting the imbalance is desired to be. In general, higher IQ balance can be achieved with a higher M and L. that will reduce IP defined above.

The image power measured can be used as a metric that defines the effectiveness of tuning. IQ balance in the receiver is restored through the compensator:

$$cx(n)=rx(n)+w_2 rx^*(n)$$

where cx(n) is the compensated output. By tuning one complex variable, w2, IQ balance can be restored. When used in the transmitter, the imbalance is compensated for in the forward TX path by applying a correction term of $w_2 tx^*(n)$. Hence, the transmitted signal is $tx'(n)=tx(n)+w_2 tx^*(n)$. In both these cases, the goal is update $w_2$ such that IP detected is reduced over the measurement window due to the update. An update in $w_2$ in the right direction will reduce the measured IP.

Signal power can be simply determined by defining:

$$p(k) = \sum_{n=kM}^{(k+1)M-1} rx(n) \cdot A(n) e^{-j\varphi(n)}$$

The same engine will now measure the power of the desired signal, instead of the image.

$$p(k) \approx \sum_{n=kM}^{(k+1)M-1} A^2(n)e^{j\theta} = \beta e^{j\theta} \sum_{n=kM}^{(k+1)M-1} A^2(n)$$

Where θ is the phase rotation introduced in the RX mixer.

In summary, by using $$s(k) = \sum_{n=kM}^{(k+1)M-1} rx(n) \cdot A(n) e^{j\varphi(n)}$$

instead of rx(n) to determine the IQ imbalance, the averaging operating allows achieving a higher dynamic range than the capability of the ADC 70a, 70b used. A lower resolution ADC 70a, 70b can now be used while still having the ability to observe a very small image power below the quantization noise floor of the ADC. This is because the signal of interest is being transmitted, and s(k) is being used to detect the image power.

The receive impairment compensator, or RX DSP Block 64 is at the output of the mixers 68a, 68b. Alternatively, the receive impairment compensator 64 may be implemented within the controller itself if the receive chain is routed through the controller 21. As discussed above for the estimation and compensation of the transmit impairment, an inverse system modeling is also used for the receive impairment Example components of a hand-held mobile wireless communications device 1000 that may be used in accordance with the present disclosure are further described in the example below with reference to FIG. 4. The device 1000 illustratively includes a housing 1200, a keypad 1400 and an output device 1600. The output device shown is a display 1600, which may comprise a full graphic LCD. In some example embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some example embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 4:
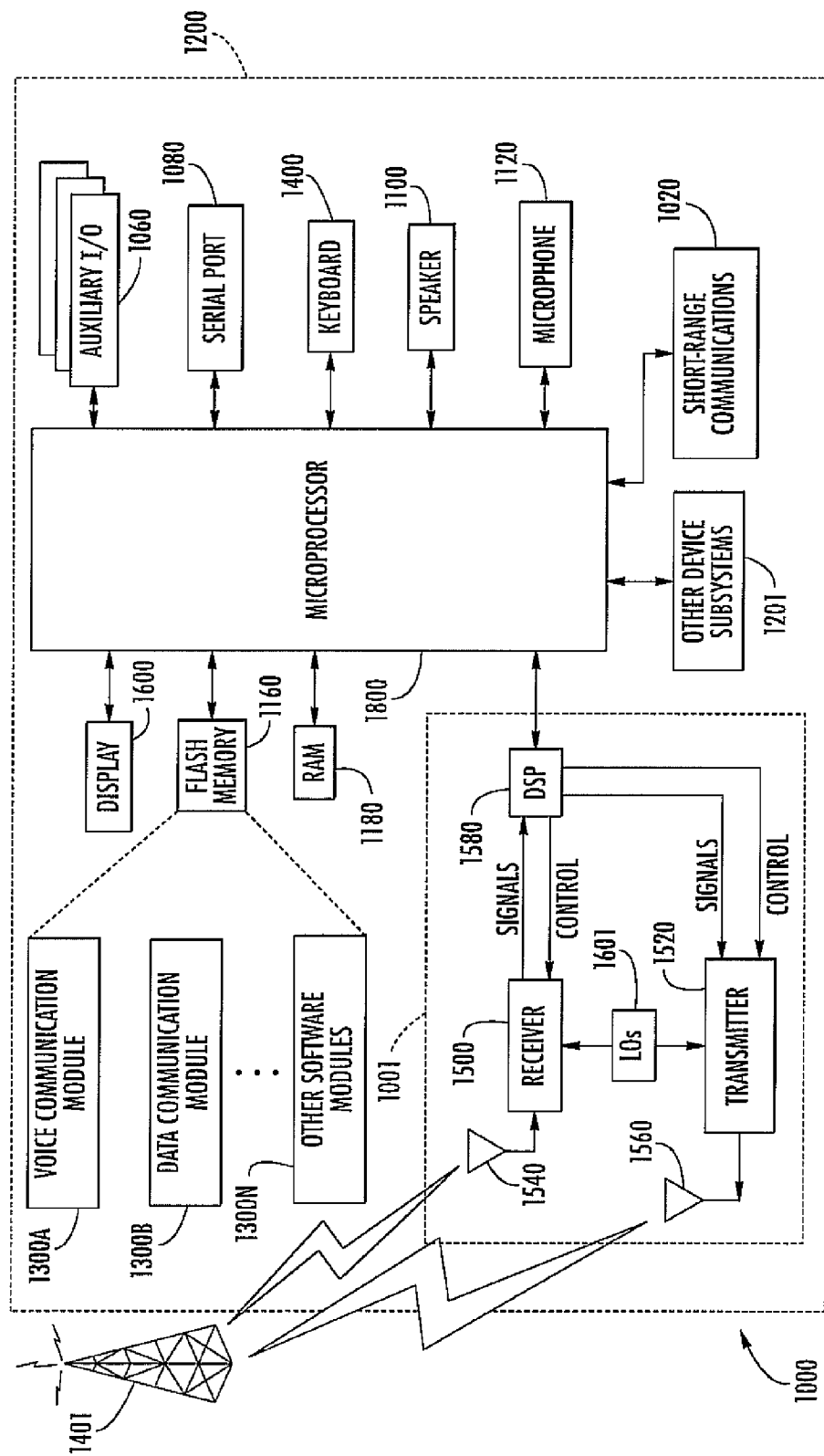
FIG. 4 is a schematic block diagram illustrating components of a mobile wireless communications device in accordance with an example embodiment of the present disclosure.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A mobile wireless communications device comprising:
    a baseband input configured to receive a baseband signal;
    a transmitter coupled to said baseband input and configured to generate a transmit signal based upon the baseband signal, the transmit signal having an initial transmit impairment;
    an auxiliary receiver coupled to said transmitter and configured to generate a receive signal having a receive impairment therein resulting from the initial transmit impairment;
    a controller coupled to said baseband input and said auxiliary receiver, said controller configured to
        determine a power of the baseband signal by integrating a product of the receive signal and a complex conjugate of the baseband signal,
        determine a power of the receive signal by integrating a product of the baseband signal and the receive signal,
        determine the initial transmit impairment based upon the power of the baseband signal and the power of the receive signal, and
        generate a transmit impairment compensation signal based upon the initial transmit impairment.

2. The mobile wireless communications device of claim 1, wherein said controller is configured to determine the power of the baseband signal and the power of the receive signal sequentially.

3. The mobile wireless communications device of claim 1, wherein said controller comprises a first correlator configured to determine the power of the baseband signal, and a second correlator configured to determine the power of the receive signal.

4. The mobile wireless communications device of claim 1, wherein said controller comprises a delay block configured to delay the baseband signal before determination of the power of the baseband signal and the power of the receive signal.

5. The mobile wireless communications device according to claim 1 wherein the transmit signal comprises an in-phase (I) component and a quadrature-phase (Q) component.

6. The wireless communications device according to claim 1 wherein said transmitter comprises a transmit impairment compensator coupled to said controller and configured to compensate the transmit signal based on the transmit impairment compensation signal.

7. The mobile wireless communications device of claim 1, wherein said transmitter comprises at least one digital-to-analog converter (DAC) coupled downstream of said baseband input.

8. The mobile wireless communications device of claim 7, wherein said transmitter further comprises at least one mixer coupled downstream of said at least one DAC.

9. The mobile wireless communications device of claim 8, wherein said transmitter further comprises a phase locked loop (PLL) coupled to said at least one mixer.

10. The mobile wireless communications device of claim 8, wherein said transmitter further comprises at least one power amplifier downstream from said at least one mixer.

11. The mobile wireless communications device of claim 1, wherein said auxiliary receiver comprises a low noise amplifier (LNA), and at least one mixer coupled downstream of said LNA.

12. The mobile wireless communications device of claim 11, wherein said auxiliary receiver further comprises a receiver phase locked loop (RXPLL) coupled to said at least one mixer.

13. The mobile wireless communications device of claim 12, wherein said auxiliary receiver further comprises at least one analog-to-digital converter (ADC) coupled downstream of said at least one mixer.

14. The mobile wireless communications device according to claim 1 wherein the transmit signal comprises an in-phase (I) component and a quadrature-phase (Q) component.

15. A mobile wireless communications device comprising:
a baseband input configured to receive a baseband signal;
a transmitter coupled to said baseband input and configured to generate a transmit signal based upon the baseband signal, the transmit signal having an initial transmit impairment;
an auxiliary receiver coupled to said transmitter and configured to generate a receive signal having a receive impairment therein resulting from the initial transmit impairment;
a controller coupled to said baseband input and said auxiliary receiver, said controller configured to
determine a power of the baseband signal by integrating a product of the receive signal and a complex conjugate of the baseband signal,
determine a power of the receive signal by integrating a product of the baseband signal and the receive signal,
determine the initial transmit impairment based upon the power of the baseband signal and the power of the receive signal, and
generate a transmit impairment compensation signal based upon the initial transmit impairment;
said controller comprising a delay block configured to delay the baseband signal before determination of the power of the baseband signal and the power of the receive signal;
said transmitter comprising a transmit impairment compensator coupled to said controller and configured to compensate the transmit signal based on the transmit impairment compensation signal.

16. The mobile wireless communications device of claim 15, wherein said controller is configured to determine the power of the baseband signal and the power of the receive signal sequentially.

17. The mobile wireless communications device of claim 15, wherein said controller comprises a first correlator configured to determine the power of the baseband signal, and a second correlator configured to determine the power of the receive signal.

18. A method of operating a mobile wireless communications device comprising:
receiving a baseband signal at a baseband input;
generating a transmit signal based upon the baseband signal, the transmit signal having an initial transmit impairment, using a transmitter coupled to the baseband input;
generating a receive signal having a receive impairment therein resulting from the initial transmit impairment, using an auxiliary receiver coupled to said transmitter;
determining a power of the baseband signal by integrating a product of the receive signal and a complex conjugate of the baseband signal, using a controller coupled to the baseband input and the auxiliary receiver;
determining a power of the receive signal by integrating a product of the baseband signal and the receive signal, using the controller;
determining the initial transmit impairment based upon the power of the baseband signal and the power of the receive signal, using the controller; and
generating a transmit impairment compensation signal based upon the initial transmit impairment, using the controller.

19. The method of claim 18, further comprising compensating the transmit signal based on the transmit impairment compensation signal, using a transmit impairment compensator coupled to said controller.

20. The method of claim 18, further comprising delaying the baseband signal before determination of the power of the baseband signal and the power of the receive signal, using a delay block.

* * * * *